United States Patent
Kubo

(10) Patent No.: US 10,538,113 B2
(45) Date of Patent: Jan. 21, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideki Kubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/012,518

(22) Filed: Jun. 19, 2018

(65) Prior Publication Data

US 2018/0370255 A1    Dec. 27, 2018

(30) Foreign Application Priority Data

Jun. 21, 2017 (JP) .................. 2017-121704

(51) Int. Cl.
*B41J 3/407* (2006.01)
*B41J 11/00* (2006.01)

(52) U.S. Cl.
CPC ......... *B41J 11/0015* (2013.01); *B41J 3/4073* (2013.01)

(58) Field of Classification Search
CPC .. B41J 11/0015; B41J 3/4073; G06K 15/1868
See application file for complete search history.

(56) References Cited

U.S. PATENT DOCUMENTS

2016/0305767 A1\* 10/2016 Sano ............... B41J 2/2103
2016/0368293 A1\* 12/2016 Shimada ............ B41J 29/38

FOREIGN PATENT DOCUMENTS

JP    2016-210139 A    12/2016

\* cited by examiner

*Primary Examiner* — Sharon A. Polk
(74) *Attorney, Agent, or Firm* — Canon U.S.A. Inc., IP Division

(57) ABSTRACT

An image processing apparatus which generates data for forming a shaped object configured of at least a first layer and a second layer as layers of recording materials on a recording medium, the image processing apparatus includes an acquisition unit configured to acquire data relating to a shape of the first layer and data for expressing a reflection characteristic of the second layer, an estimation unit configured to estimate a reflection characteristic at each predetermined area of the shaped object based on the reflection characteristic data and the shape data, and a generation unit configured to generate at least any one of recording amount data for expressing a recording amount of the recording material and dot arrangement data corresponding to dot arrangement of the recording material on the recording medium in order to form on the recording medium the shaped object having the reflection characteristic estimated by the estimation unit.

18 Claims, 9 Drawing Sheets

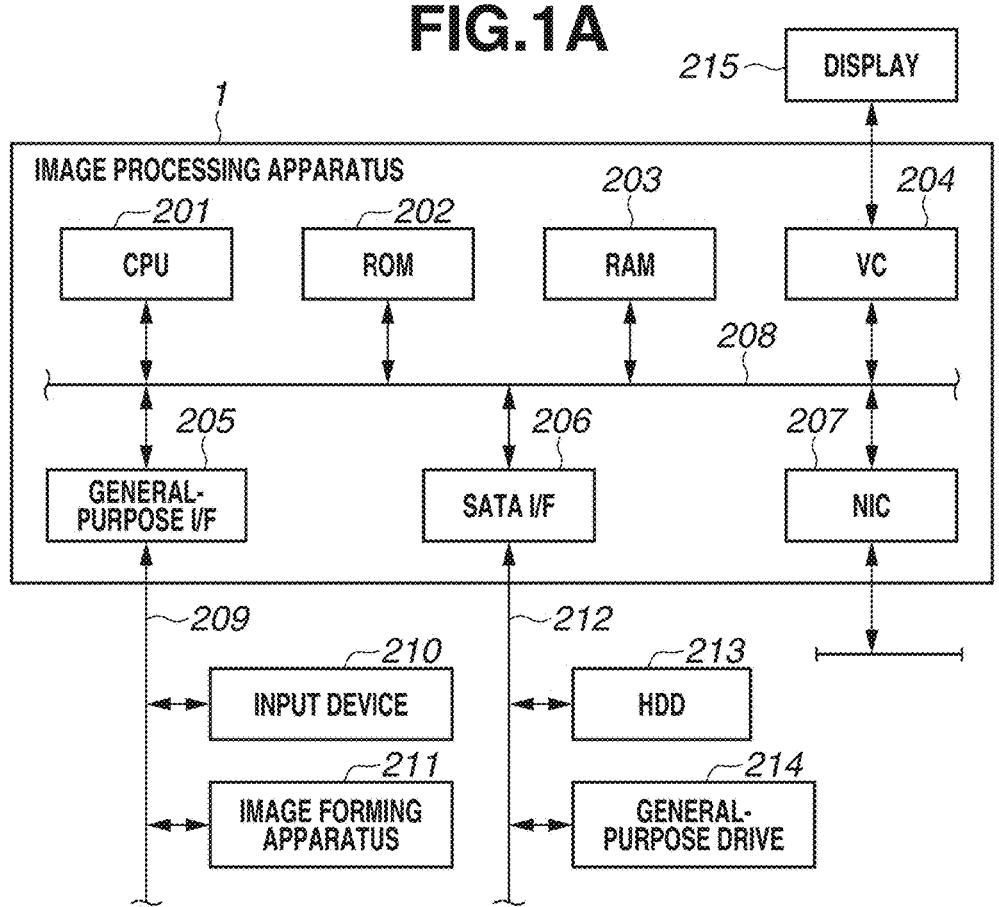
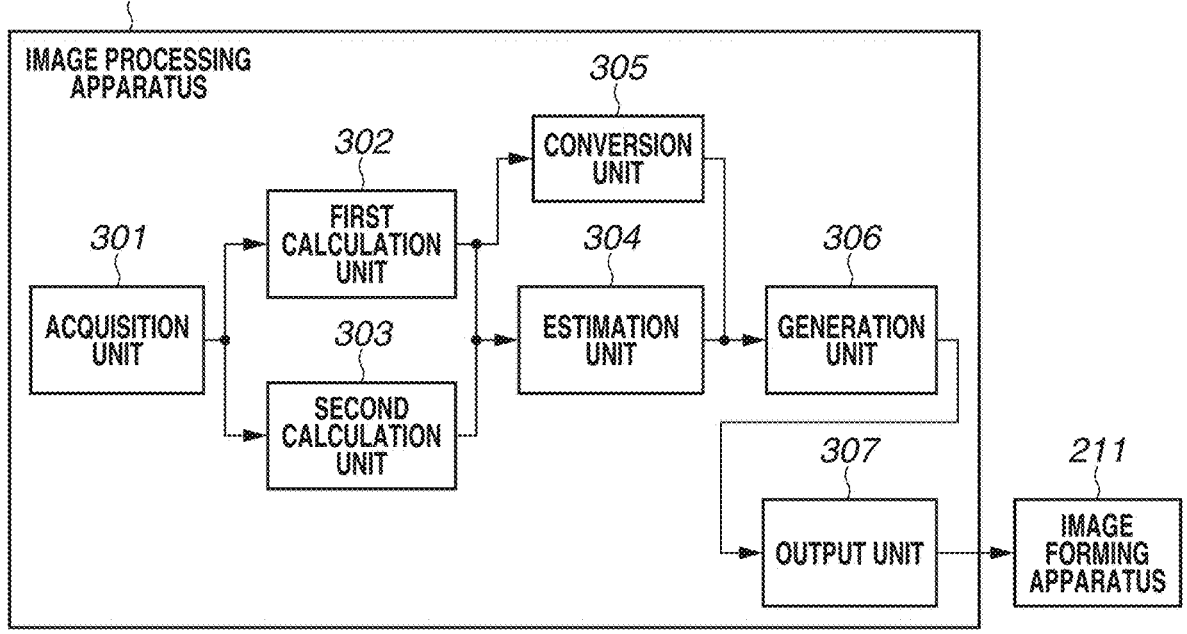

AREA A

SUB-SCANNING DIRECTION

AREA B m-TH TIME MAIN SCANNING

AREA A m+1-TH TIME MAIN SCANNING

AREA A

AREA B m+2-TH TIME MAIN SCANNING

SUB-SCANNING DIRECTION

AREA B

MAIN SCANNING DIRECTION

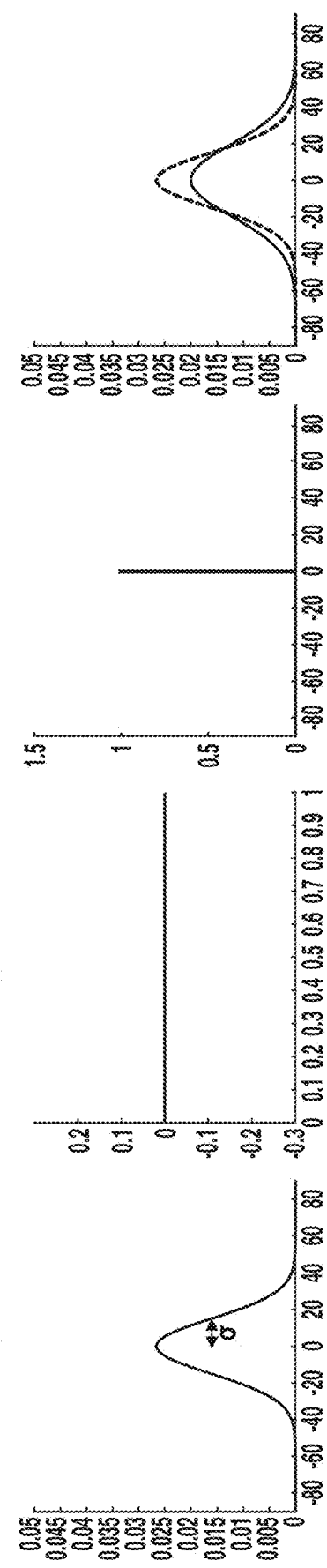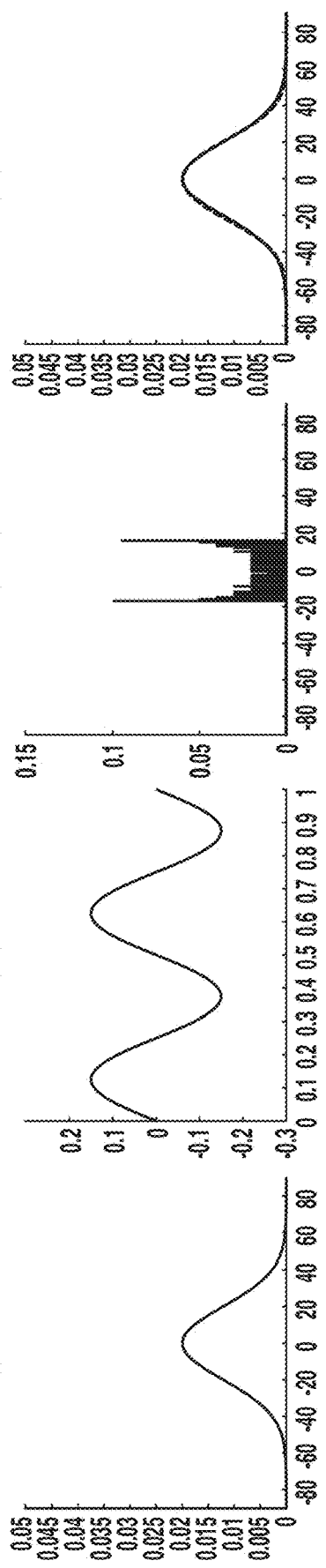

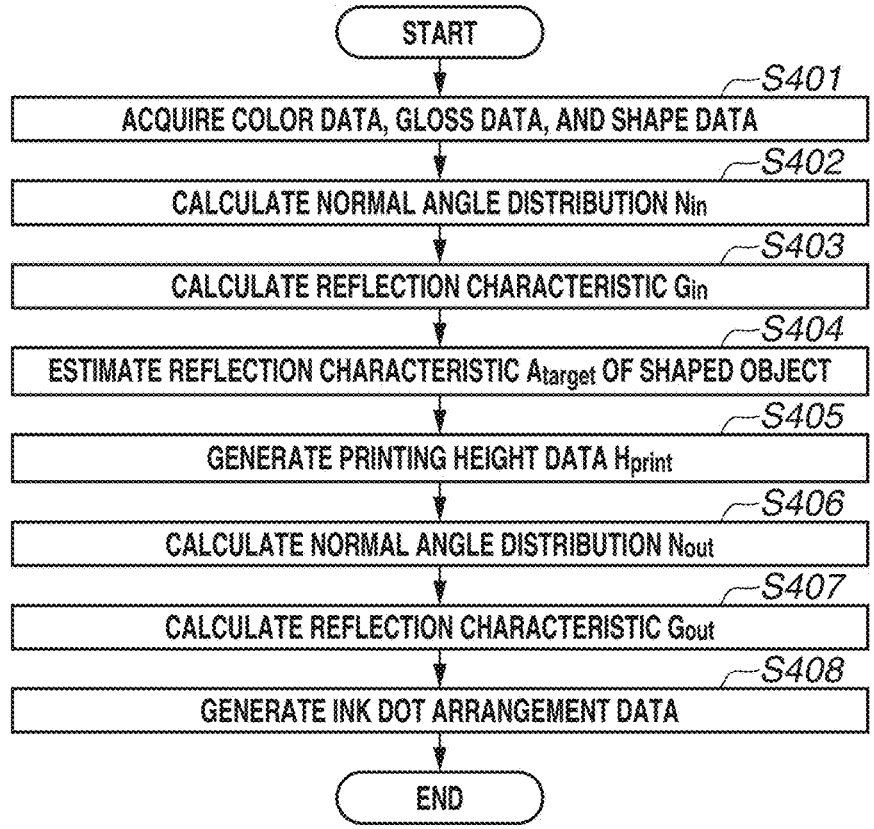
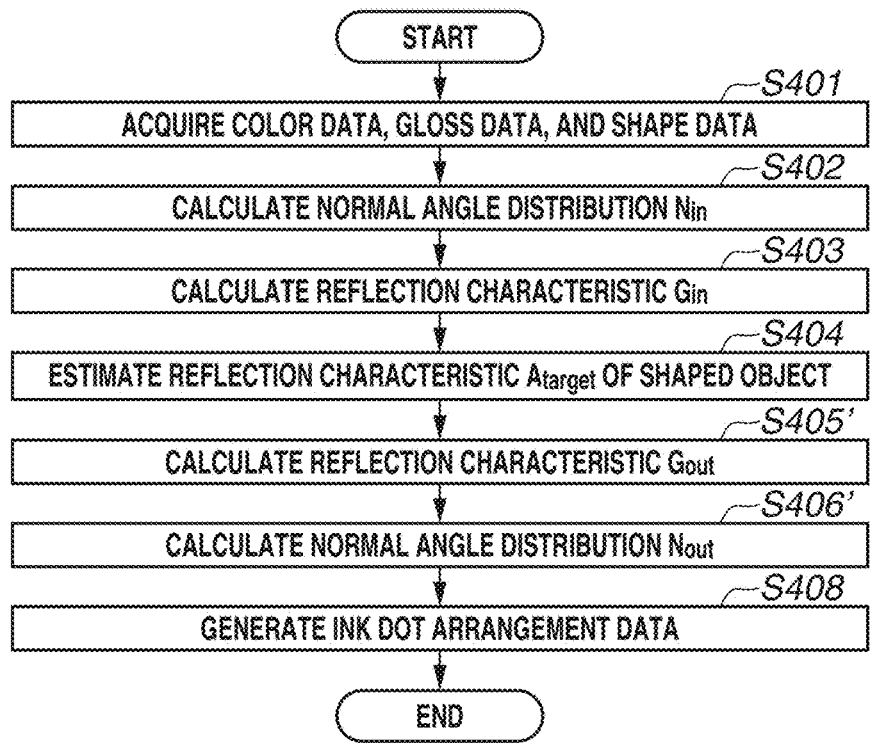

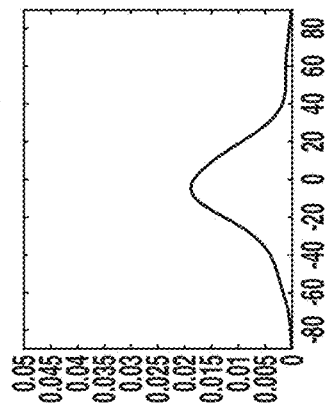
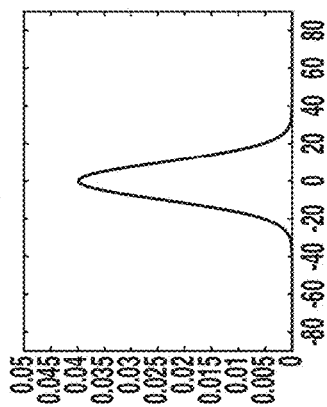
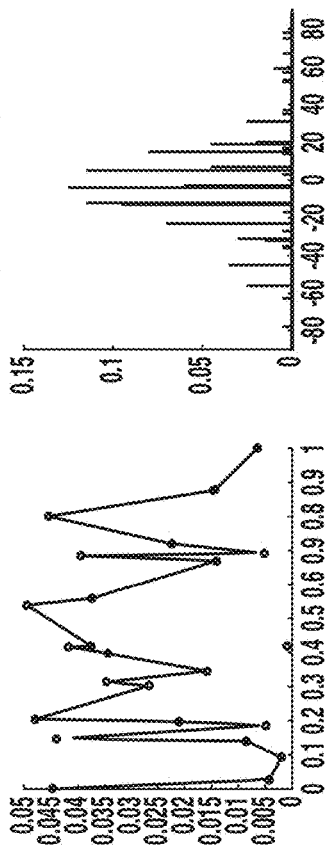
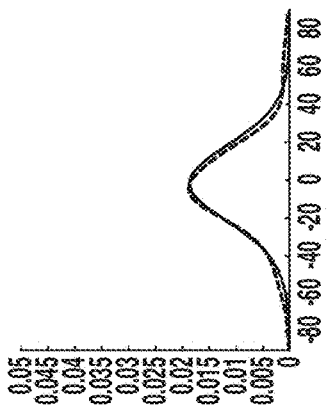
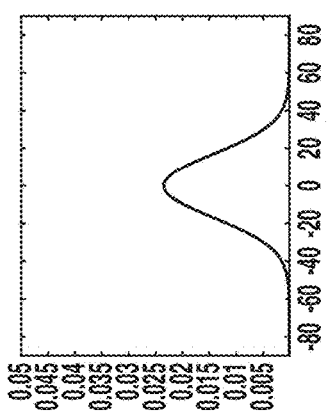
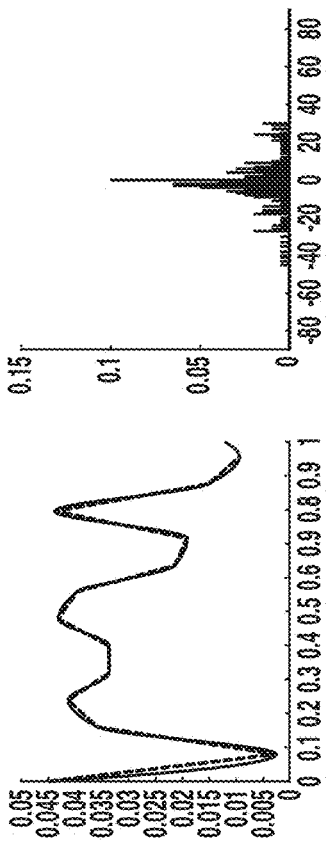
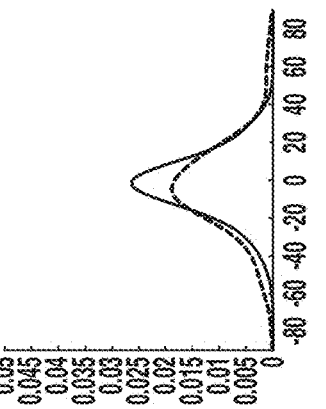

IMAGE PROCESSING APPARATUS, IMAGE PROCESSING METHOD, AND STORAGE MEDIUM

BACKGROUND OF THE INVENTION

Field of the Invention

The present disclosure relates to an image processing technique for reproducing a reflection characteristic of a shaped object formed on a recording medium.

Description of the Related Art

In recent years, there has been known a technique for forming on a recording medium a three-dimensional shape expressed by three-dimensional shape data generated by using computer graphics (CG) by inputting the three-dimensional shape data to a printer. Surface unevenness and glossiness are considered as elements for determining the external appearance of the three-dimensional shape formed on the recording medium. In order to reproduce surface unevenness and glossiness faithful to the input data on the recording medium, an output characteristic of a printer has to be taken into consideration. In a technique discussed in Japanese Patent Application Laid-Open No. 2016-210139, a ratio (change ratio) between glossiness of surface unevenness expressed by input data when the surface unevenness is formed on a recording medium and glossiness expressed by the input data is calculated based on the output characteristic of a printer, and gloss data is corrected by using the calculated ratio.

However, in the method described in Japanese Patent Application Laid-Open No. 2016-210139, there is a case where a desired reflection characteristic cannot be reproduced on a recording medium with high precision because the above-described ratio is calculated by using only a specific frequency from among frequencies that can be acquired through frequency decomposition of the input data for expressing the surface unevenness.

SUMMARY OF THE INVENTION

The present disclosure is directed to image processing for highly precisely reproducing a reflection characteristic of a shaped object formed on a recording medium.

According to an aspect of the present disclosure, an image processing apparatus which generates data for forming a shaped object configured of at least a first layer and a second layer as layers of recording materials on a recording medium, the image processing apparatus includes an acquisition unit configured to acquire data relating to a shape of the first layer and data for expressing a reflection characteristic of the second layer, an estimation unit configured to estimate a reflection characteristic at each predetermined area of the shaped object based on the reflection characteristic data and the shape data, and a generation unit configured to generate at least any one of recording amount data for expressing a recording amount of the recording material and dot arrangement data corresponding to dot arrangement of the recording material on the recording medium in order to form on the recording medium the shaped object having the reflection characteristic estimated by the estimation unit.

Further features of the present disclosure will become apparent from the following description of exemplary embodiments with reference to the attached drawings.

BRIEF DESCRIPTION OF THE DRAWINGS

FIGS. 1A and 1B are block diagrams illustrating configurations of an image processing apparatus.

FIGS. 7A to 7H are graphs illustrating a reflection characteristic of a shaped object according to a relationship between an uneven layer and a gloss layer.

FIGS. 8A and 8B are flowcharts illustrating processing to be executed by the image processing apparatus.

FIGS. 9A to 9I are graphs illustrating examples of data used for the processing to be executed by the image processing apparatus.

DESCRIPTION OF THE EMBODIMENTS

Figure 2:
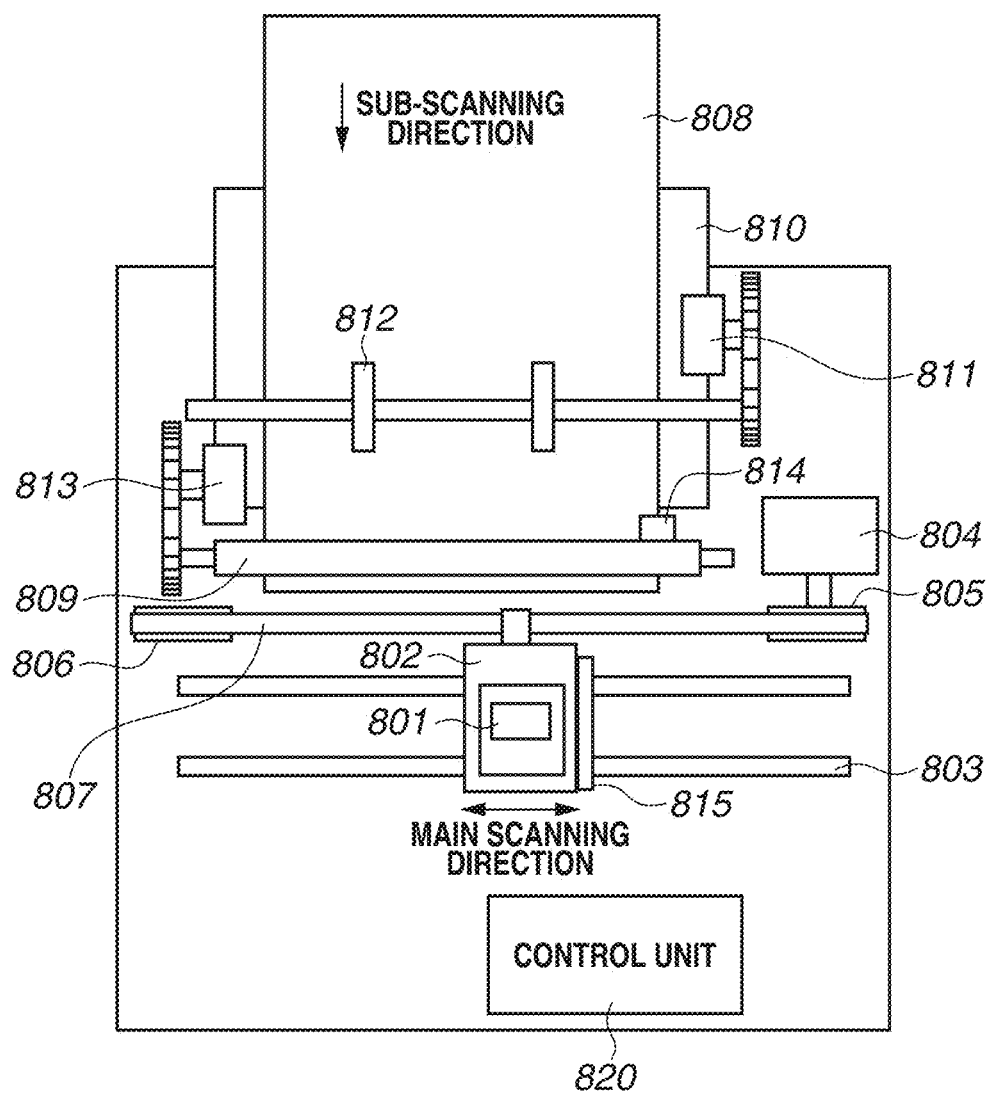
FIG. 2 is a diagram illustrating a configuration of an image forming apparatus.

In the present exemplary embodiment, processing of generating data for forming on a recording medium a three-dimensional shaped object configured of an uneven layer having an uneven shape, a gloss layer for expressing glossiness, and an image layer for expressing color will be described.

<Hardware Configuration of Image Processing Apparatus 1>

A hardware configuration of an image processing apparatus 1 will be described with reference to FIG. 1A. For example, the image processing apparatus 1 is a computer having a central processing unit (CPU) 201, a read only memory (ROM) 202, and a random access memory (RAM) 203. The CPU 201 uses the RAM 203 as a work memory and executes an operating system (OS) or various programs stored in the ROM 202 or a hard disk drive (HDD) 213. Further, the CPU 201 controls various constituent elements via a system bus 208. A program code stored in the ROM 202 or the HDD 213 is loaded on the RAM 203, and the CPU 201 executes processing illustrated in the below-described flowchart. A display 215 is connected to a video card (VC) 204. An input device 210 such as a mouse or a keyboard and an image forming apparatus 211 are connected to a general-purpose interface (I/F) 205 via a serial bus 209. The HDD 213 and a general-purpose drive 214 for reading or writing various recording media are connected to a serial advanced technology attachment (SATA) I/F 206 via a serial bus 212. The input and output of information is executed by a network interface card (NIC) 207 and an external apparatus. The CPU 201 uses various recording media mounted on the HDD 213 and the general-purpose drive 214 as storage areas of various kinds of data. The CPU 201 displays on a display 215 a user interface (UI) screen provided by a program and receives an input such as a user instruction that is accepted via the input device 210.

<Logical Configuration of Image Processing Apparatus 1>

FIG. 1B is a block diagram illustrating a logical configuration of the image processing apparatus 1. The image processing apparatus 1 includes an acquisition unit 301, a first calculation unit 302, a second calculation unit 303, an estimation unit 304, a conversion unit 305, a generation unit 306, and an output unit 307.

The acquisition unit 301 acquires color data for expressing a color of an image layer, reflection characteristic data for expressing a specular reflection intensity of a gloss layer, and shape date for expressing a height from a reference face of an uneven layer surface. The first calculation unit 302 calculates a normal angle distribution of the uneven layer surface based on the height of the uneven layer surface expressed by the shape data. The second calculation unit 303 calculates a reflection characteristic of a gloss layer according to an incident angle and an output (reflection) angle of light based on the specular reflection intensity of the gloss layer expressed by the reflection characteristic data. The estimation unit 304 estimates a reflection characteristic of a shaped object configured of an uneven layer having a normal angle distribution calculated by the first calculation unit 302 and a gloss layer having a reflection characteristic calculated by the second calculation unit 303. The conversion unit 305 convers the shape data based on an output characteristic of the image forming apparatus 211. Based on the reflection characteristic estimated by the estimation unit 304 and the shape data converted by the conversion unit 305, the generation unit 306 generates correction reflection characteristic data which expresses the reflection characteristic of the gloss layer for forming the shaped object having the estimated reflection characteristic on the recording medium. Based on the color data, the correction reflection characteristic data, and the shape data, the output unit 307 generates dot arrangement data for expressing dot arrangement of a recording material recorded on a recording medium and outputs the generated dot arrangement data to the image forming apparatus 211.

<Configuration of Image Forming Apparatus 211>

FIG. 2 is a diagram illustrating a configuration of an image forming apparatus 211. The image forming apparatus 211 of the present exemplary embodiment is an ink-jet printer which forms a three-dimensional shaped object by executing recording of ink on a recording medium. The three-dimensional shaped object is configured of an uneven layer formed of a clear ink, a gloss layer formed of a white ink, and an image layer formed of a color ink.

A head cartridge 801 includes a recording head configured of a plurality of discharge ports and an ink tank for supplying ink to the recording head. Further, a connector that receives a signal for driving the respective discharge ports of the recording head is provided thereon. A total of six inks, i.e., a clear ink, a white ink, and color inks of cyan, magenta, yellow, and black, are independently provided on the ink tank. The above-described inks are each an ultra violet (UV) curable ink that is hardened when the inks are irradiated with UV light. The head cartridge 801 is positioned and mounted on a carriage 802 in a replaceable state. A connector holder for transmitting a driving signal to the head cartridge 801 via the connector is provided on the carriage 802. Further, an ultraviolet light irradiation device 815 is mounted on the carriage 802 and controlled to emit UV light on a discharged UV curable ink, so that the discharged UV curable ink is fixed to a recording medium. The carriage 802 can be moved back and forth along a guide shaft 803. Specifically, the carriage 802 is driven by a main scanning motor 804 serving as a driving source via driving mechanisms such as a motor pulley 805, a driven pulley 806, and a timing belt 807, and a position and a movement thereof are controlled thereby. In the present exemplary embodiment, movement of the carriage 802 along the guide shaft 803 is called as "main scanning", and a moving direction thereof is called as "main scanning direction". A recording medium 808 such as a printing sheet is placed on an auto-sheet feeder (hereinafter, "ASF") 810. When an image is to be formed, a pick-up roller 812 is rotated by a driving force of a feeding motor 811 via a gear, and the recording medium 808 is separated and fed from the ASF 810 one-by-one. Further, the recording medium 808 is conveyed to a recording start position that faces a discharge port face of the head cartridge 801 on the carriage 802 through rotation of a conveyance roller 809. The conveyance roller 809 is driven by a line feed (LF) motor 813 serving as a driving source via a gear. Whether the recording medium 808 has been fed is determined and a sheet feeding position thereof is confirmed when the recording medium 808 passes through a paper end sensor 814. The head cartridge 801 mounted on the carriage 802 is held in such a state that the discharge port face thereof is projected downward from the carriage 802 to become parallel to the recording medium 808. A control unit 820 is configured of a CPU and a storage unit, and receives data for forming the above-described layers from the outside to control operations of respective units of the image forming apparatus 211 based on the data.

<Operation of Image Forming Apparatus 211>

Hereinafter, operations of forming an uneven layer, a gloss layer, and an image layer by the image forming apparatus 211 having the configuration illustrated in FIG. 2 will be described. A metallic paper (metallic medium) having a surface with glossiness higher than that of an area where the above-described white ink is recorded is used as the recording medium 808 of the present exemplary embodiment. When the recording medium 808 is conveyed to a predetermined recording start position, the carriage 802 moves above the recording medium 808 along the guide shaft 803, and a clear ink is discharged from the discharge port of the recording head during the movement thereof. The ultraviolet light irradiation device 815 emits UV light along with the movement of the recording head, and causes the discharged clear ink to be hardened and fixed onto the recording medium 808. Then, when the carriage 802 moves to one end of the guide shaft 803, the conveyance roller 809 conveys the recording medium 808 by a predetermined amount in a direction vertical to the scanning direction of the carriage 802. In the present exemplary embodiment, this conveyance of the recording medium 808 is called as "sheet feeding" or "sub-scanning", and the conveyance direction thereof is called as "sheet feeding direction" or "sub-scanning direction". When the recording medium 808 has been conveyed by the predetermined amount, the carriage 802 moves along the guide shaft 803 again. As described above, scanning operation of the carriage 802 of the recording head and sheet feeding are repeatedly executed, so that an uneven shape (uneven layer) is formed on the recording medium 808. After the uneven layer is formed thereon, the conveyance roller 809 returns the recording medium 808 to the recording start position. Subsequently, a white ink is recorded on top of the uneven layer through the processing similar to the processing of forming the uneven layer, so that a gloss layer is formed thereon. Further, a color ink is recorded on top of the gloss layer through similar processing, so that an image layer is formed thereon.

Figure 3:
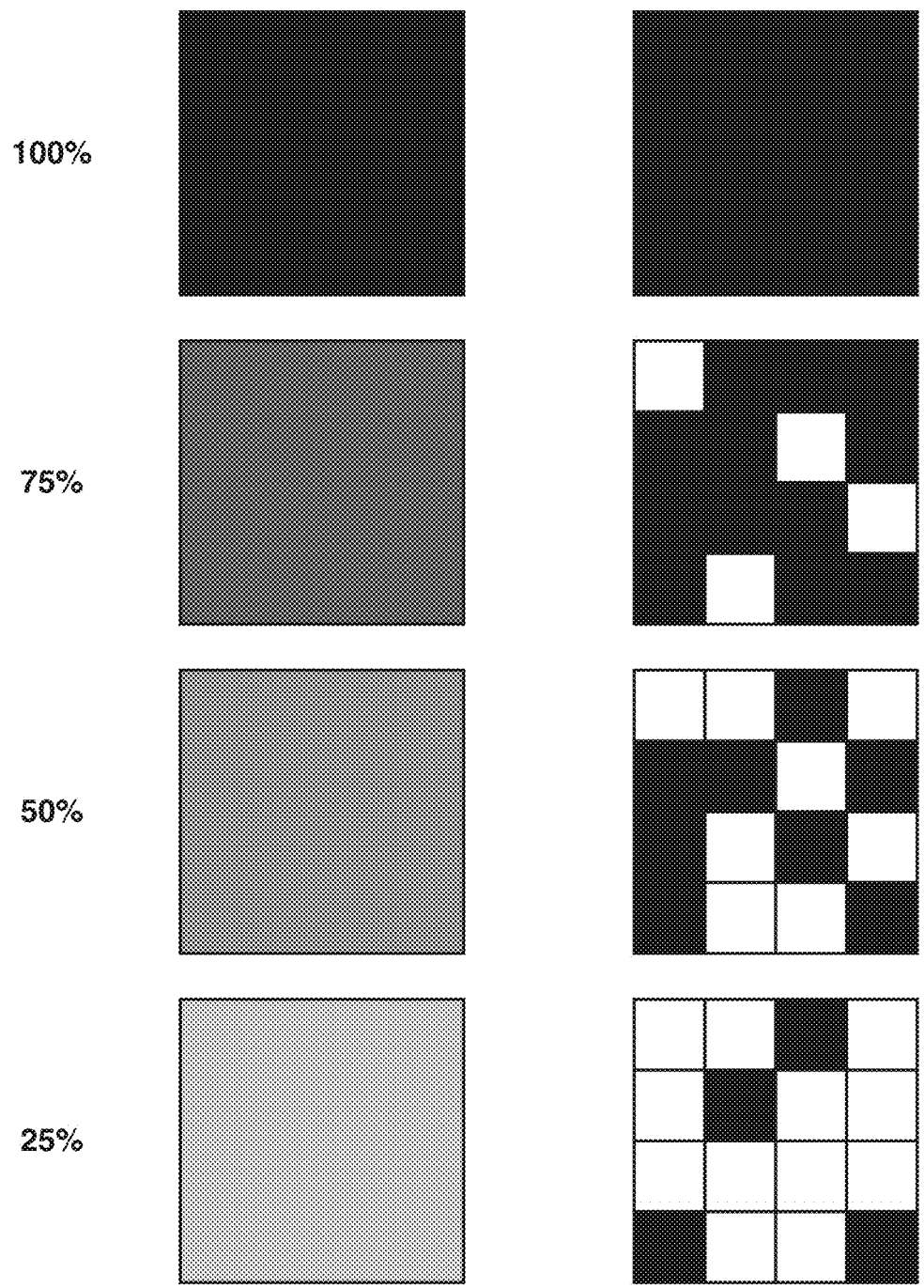
FIG. 3 is a diagram schematically illustrating gradation expression of an image expressed by a area coverage modulation method.

FIG. 3 is a diagram schematically illustrating expression of an image controlled by a area coverage modulation method. In order to simplify the description, it is assumed that the recording head of the present exemplary embodiment is controlled by a binary notation of whether to discharge ink droplets. In the present exemplary embodiment, an ON/OFF state of ink is controlled at each pixel defined by an output resolution of the image forming apparatus 211, and a state where all of pixels in a unit area are brought into an ON state should be considered as an ink recording amount of 100%. In addition, "ON" refers to discharge of ink, whereas "OFF" refers to non-discharge of ink. In the above-described binary printer, because only a density of 100% or 0% can be expressed by a single pixel, halftone is expressed by a group of pixels. In the example illustrated in FIG. 3, instead of expressing the halftone of a density of 25% as illustrated in a bottom-left image, the halftone is expressed by an areal density of 25% by discharging ink to four pixels from among the pixels in four-by-four (4/16) as illustrated in a bottom-right image. The other gradations can be also expressed in a same manner. A total number of pixels for expressing the halftone or a pattern of pixels to be "ON" is not limited to the above example. A pattern of pixels to be "ON" can be determined by executing processing using a periodic screen called as "halftone dot" or by executing error diffusion processing. By extending the above-described binarization processing to multi-value processing of a plurality of modulable levels, the present exemplary embodiment is also applicable to a recording head capable of modulating a discharge amount of ink. Therefore, the present exemplary embodiment is not limited to the binarization processing.

In the formation of the uneven layer in the present exemplary embodiment, a height is controlled at each position by employing a concept of the above-described ink recording amount. When the uneven layer is to be formed, if a substantially uniform layer is formed at an ink recording amount of 100%, the layer has a certain thickness (height) according to a volume of the discharged ink. For example, if one layer formed at a recording amount of 100% has a height of 20 µm, layers may be stacked one upon another by five times so that a height of 100 µm is to be reproduced. In other words, ink of a recording amount of 500% is discharged to a position where a height of 100 µm is required.

Figure 4A:
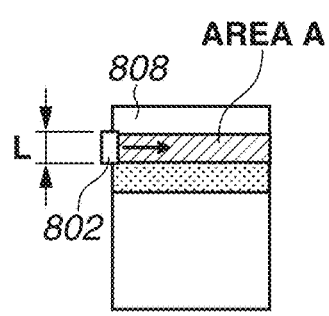
FIGS. 4A to 4E are diagrams illustrating an operation of the image forming apparatus for forming a shaped object on a recording medium.
Figure 4B:
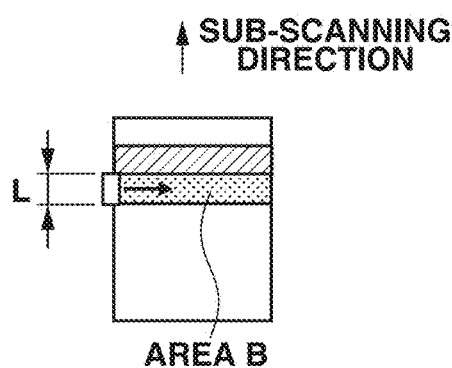

FIGS. 4A to 4E are diagrams illustrating an operation of forming an uneven layer, a gloss layer, and an image layer by scanning the recording medium 808 with the recording head. Through main scanning to be executed by the carriage 802, a layer is formed by a width L of the recording head, and the recording medium 808 is conveyed in the sub-scanning direction by a distance L every time one-line of recording is ended. In order to simplify the description, it is assumed that the image forming apparatus 211 of the present exemplary embodiment can only discharge ink of a recording amount of 100% at one time of scanning operation, so that the same area is scanned a plurality of times without conveying the recording medium 808 if a layer that exceeds a recording amount of 100% is to be formed. For example, in a case where the recording amount of ink to be discharged is a maximum of 500%, the same line is scanned by five times. As illustrated in FIGS. 4A to 4E, after the area A is scanned with the recording head by five times (FIG. 4A), the recording medium 808 is conveyed in the sub-scanning direction, and main scanning of an area B is repeatedly executed by five times (FIG. 4B).

Figure 4C:
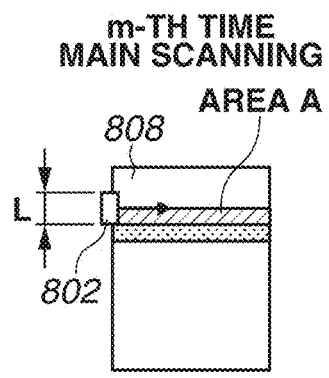
Figure 4D:
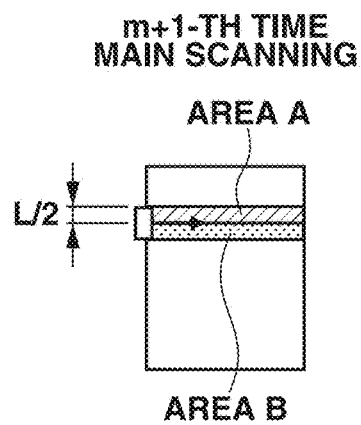
Figure 4E:
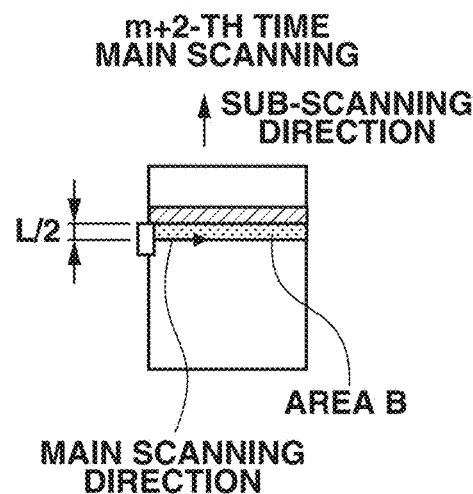

In order to suppress deterioration of image quality such as periodic unevenness caused by driving precision of the recording head, a plurality of times of scanning, i.e., a so-called multi-pass printing, may be executed even if a recording amount is 100% or less. An example of two-pass recording is illustrated in FIGS. 4C to 4E. In this example, through main scanning to be executed by the carriage 802, a layer is formed by a width L of the recording head, and the recording medium 808 is conveyed in the sub-scanning direction by a distance L/2 every time one-line of recording is ended. The area A is recorded by m-th time main scanning (FIG. 4C) and m+1-th time main scanning (FIG. 4D) executed by the recording head, and the area B is recorded by m+1-th time main scanning (FIG. 4D) and m+2-th time main scanning (FIG. 4E) executed by the recording head. Herein, although a two-pass recording operation has been described, recording of how many times of passes is executed can be changed according to a desired precision. For example, if n-pass recording is executed, the recording medium 808 is conveyed in the sub-scanning direction by a distance L/n every time one-line of recording is ended. In this case, even if the ink recording amount is 100% or less, the recording head executes n-time of main scanning on a same line of the recording medium 808 to form the uneven layer, the gloss layer, or the image layer by dividing the layer into a plurality of printing patterns. In the present exemplary embodiment, in order to avoid confusion between the scanning operation for executing the above-described multi-pass printing and the scanning operation for discharging ink of a recording amount of 100% or more, it is assumed that the multi-pass printing is not executed, and that a plurality of times of scanning operations is executed in order to stack the layers. The recording medium 808 is not limited to paper, and a plastic film or materials of various types can be used as long as the layer can be formed thereon by the recording head.

<Shaped Object to be Formed on Recording Medium>

Figure 5:
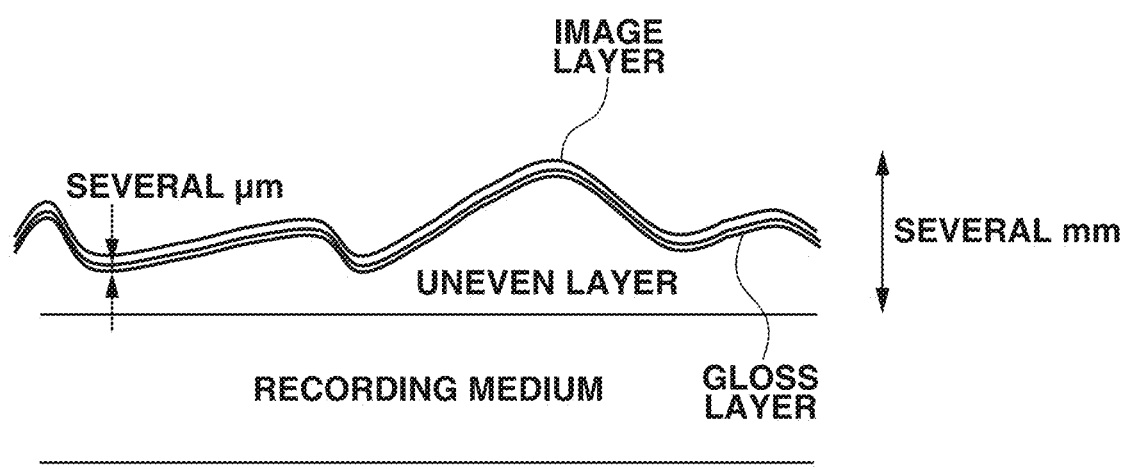
FIG. 5 is a diagram illustrating a cross-sectional view of a shaped object formed on a recording medium.

FIG. 5 is a diagram illustrating a cross-sectional view of a shaped object configured of an uneven layer, a gloss layer, and an image layer formed on a recording medium. In the present exemplary embodiment, an uneven layer having a height distribution of several-millimeters (mm) is formed on a high-gloss metallic paper. Then, a gloss layer is formed on top of the uneven layer surface, and an image layer is further formed on top of the gloss layer. More precisely, although each of the gloss layer and the image layer has a height distribution, an influence of the height on the final uneven shape is minimal and ignorable because a thickness thereof is sufficiently smaller than that of the uneven layer. In consideration of the height distributions of the gloss layer and the image layer, it is possible to modify the height expressed by the shape data.

Figure 6A:
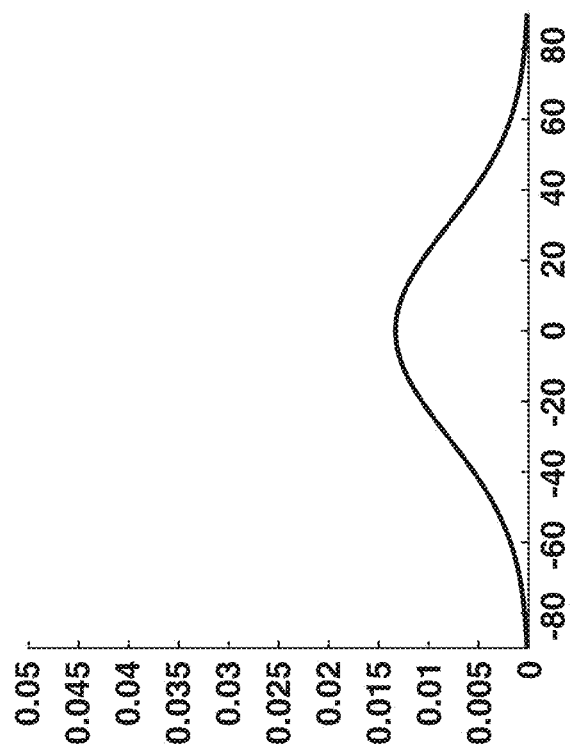
FIGS. 6A and 6B are graphs illustrating a reflection characteristic of a gloss layer.
Figure 6B:
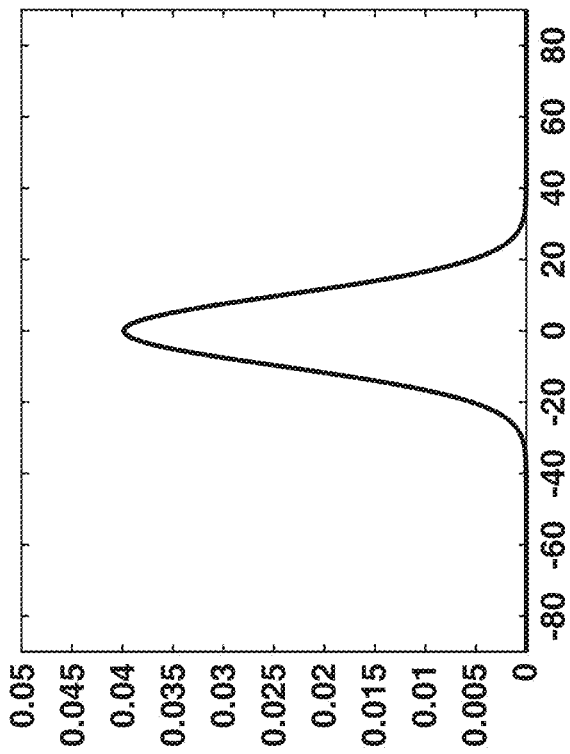

The reflection characteristic in the gloss layer is controlled by an area ratio between a high-gloss area and a low-gloss area of the recording medium. The glossiness in the present exemplary embodiment is controlled by an area ratio between an area where the white ink is recorded and an area where the white ink is not recorded. FIGS. 6A and 6B are diagrams schematically illustrating a difference of reflection characteristics of the printed material according to an area ratio between the area where the white ink is recorded and the area where the white ink is not recorded.

FIG. 6A is a graph illustrating an example of a surface reflection characteristic of a printed material in which an area ratio of the area where the white ink is recorded is 0%, and FIG. 6B is a graph illustrating an example of a surface reflection characteristic of a printed material in which an area ratio of the area where the white ink is recorded is 100%. Each of the graphs illustrates the reflection characteristic with respect to light emitted from a certain point light source, and the horizontal axis represents an output angle of reflection light, whereas the vertical axis represents reflection intensity of the reflection light. The output angle is an angle that takes a specular direction of incident light as 0-degree. In the area where the white ink is recorded, a diffuse reflection component of reflection light is large, and thus light is reflected at various angles (in multiple directions). On the other hand, on a high-specular surface such as a surface of the metallic paper, a specular reflection component of reflection light is large. In the present exemplary embodiment, although an uneven layer is provided between a gloss layer and a recording medium, a metallic paper as a base material can be observed because the uneven layer is formed of a clear ink and thus, has high transmissivity. Therefore, a surface where the white ink is not recorded can be regarded as a surface where the base material is exposed, and thus, the surface has a characteristic close to a specular surface. By controlling the area ratio of a surface having the above-described two characteristics, a reflection characteristic intermediate between the reflection characteristics of a diffusion surface formed of the white ink and a specular surface formed of the metallic paper can be expressed. A reflection characteristic of the image layer formed on top of the gloss layer has an influence on a reflection characteristic of the printed material. However, in order to simplify the description, it is assumed that the reflection characteristic of the image layer is minimal and ignorable. The reflection characteristic of the gloss layer can be corrected with consideration of an influence of the image layer on the reflection characteristic.

Subsequently, a reflection characteristic of a shaped object according to a relationship between the uneven layer and the gloss layer will be described with reference to FIGS. 7A to 7H. Similar to the graphs in FIGS. 6A and 6B, FIGS. 7A and 7B are graphs illustrating surface reflection characteristics of flat surfaces of gloss layers. When these surface reflection characteristics are approximated to the Gaussian distribution, standard deviations are 15 ($\sigma=15$) and 20 ($\sigma=20$) in FIGS. 7A and 7B respectively. The gloss layer is closer to a specular surface when the standard deviation $\sigma$ is smaller, and the gloss layer is closer to a diffusion surface when the standard deviation $\sigma$ is greater. FIGS. 7C and 7D are graphs illustrating shapes of the uneven layers. FIG. 7C illustrates a flat surface, whereas FIG. 7D illustrates sinusoidal unevenness having an amplitude of approximately 0.15 mm with respect to a width of 0.5 mm. In the present exemplary embodiment, the shape of the shaped object is expressed by a two-dimensional height distribution. However, herein, in order to simplify the description, the exemplary embodiment will be described by using a one-dimensional height distribution. FIGS. 7E and 7F are respective graphs illustrating normal angle distributions of the shapes illustrated in FIGS. 7C and 7D.

A dashed line in FIG. 7G illustrates a surface reflection characteristic when a surface having the surface reflection characteristic in FIG. 7A has the shape illustrated in FIG. 7C. Because the shape illustrated in FIG. 7C is a plane surface, the dashed line in FIG. 7G illustrates a surface reflection characteristic that is the same as the surface reflection characteristic in FIG. 7A. A solid line in FIG. 7G illustrates a surface reflection characteristic when a surface having the surface reflection characteristic in FIG. 7A has the shape illustrated in FIG. 7D. This surface reflection characteristic is expressed as a result of a convolution operation of the surface reflection characteristic of the plane surface illustrated in FIG. 7A and the normal angle distribution illustrated in FIG. 7F. A solid line in FIG. 7H illustrates a surface reflection characteristic when a surface having the surface reflection characteristic in FIG. 7B has the shape illustrated in FIG. 7C. Similar to the solid line in FIG. 7G, a dashed line in FIG. 7H illustrates a reflection characteristic when a surface having the surface reflection characteristic in FIG. 7A has the shape illustrated in FIG. 7D. The solid line and the dashed line in FIG. 7H substantially conform to each other. This indicates that substantially the same appearance (reflection characteristic) can be acquired from a combination of the different surface reflection characteristic and the uneven shape if an area where unevenness and glossiness are distributed is smaller than an area resolvable through the resolution of a visual perception. The unevenness has a wider normal angle distribution if an amplitude is greater or a cycle is shorter (frequency is higher), and light is reflected at various angles. In other words, by increasing the amplitude of unevenness or by shortening the cycle of unevenness, appearance similar to that of the surface having a reflection characteristic of high diffuse reflectivity can be acquired.

On the other hand, when the unevenness is to be formed on the recording medium, spreading of undried ink may occur according to a discharge interval of ink or an irradiation timing of UV light of the image forming apparatus 211, so that there is a case where a target uneven shape cannot be reproduced. Because a reflection direction of light is changed according to the uneven shape, a shaped object having the unintended reflection characteristic may be formed on the recording medium in a case where a target uneven shape cannot be reproduced. In the preset exemplary embodiment, in order to solve the above disadvantage, with respect to the reflection characteristic of the shaped object, a complementary relationship between the uneven shape of the uneven layer and the reflection characteristic of the gloss layer will be used. Specifically, according to an uneven shape reproduction precision (output characteristic) of the image forming apparatus 211, a difference arises between a reflection characteristic of a shaped object having a shape deviated from a target uneven shape and a reflection characteristic of a shaped object having a target uneven shape. The surface reflection characteristic of the gloss layer is corrected to complement the difference with the surface reflection characteristic of the gloss layer to be formed on top of the uneven layer.

<Flowchart of Processing to be executed by Image Processing Apparatus 1>

FIG. 8A is a flowchart illustrating a flow of processing to be performed until the image processing apparatus 1 outputs data for forming a three-dimensional shaped object on a recording material to the image forming apparatus 211.

First, in step S401, the acquisition unit 301 acquires color data for expressing a color of an image layer to be formed on a recording medium, reflection characteristic data for expressing specular reflection intensity of a gloss layer, and shape data for expressing a height from a reference surface of a uneven layer surface, from an external device such as the HDD 213. In the present exemplary embodiment, the acquisition unit 301 acquires polygon data including the color data, the reflection characteristic data, and the shape data. Generally, polygon data is data used for three-dimensional computer graphics (3DCG) which includes triangle vertex coordinates (x, y, z). The polygon data is described as a group of faces determined by a group of vertexes. In the present exemplary embodiment, the polygon data includes RGB values (color data) and specular reflection intensity (reflection characteristic data) of reflection light at each set of the vertex coordinates. A height (shape data) is expressed by a value "z" of the vertex coordinate. A reference face of the height of the shaped object, i.e., a face having "0" as a value "z", corresponds to a surface of the recording medium. RGB data stored in a file format used for the 3DCG is used as the color data. Specular reflection intensity component data stored in a file format used for the 3DCG is used as the reflection characteristic data.

In the present exemplary embodiment, although the color data, the reflection characteristic data, and the shape data are collectively acquired as the polygon data, the data may be acquired as separate data. For example, the color data may be image data in which RGB values defined in an sRGB space or an AdobeRGB space are recorded at each pixel. Further, the color data may be image data in which L*a*b* values defined in the L*a*b* space, XYZ values as tristimulus values of color, or spectral reflectivity is recorded at each pixel. The reflection characteristic data may be data for expressing a gloss characteristic of the gloss layer, e.g., diffuse reflection component data stored in a file format used for 3DCG. Further, the reflection characteristic data may be data for expressing a spatial distribution of a value of specular glossiness measured by a method compliant with the Japanese Industrial Standard (JIS) 2.8741, a value of image definition measured by a method compliant with JIS.K.7174 or JIS.H.8686, or a value of reflection haze measured by a method compliant with a standard of International Standards Organization (ISO) 13803 or American Society of Mechanical Engineers (ASTME) 430. The shape data may be data relating to a shape of the uneven layer, e.g., point group data described by a group of vertexes (x, y, z) in the three dimensional space or data for expressing a space distribution of heights or normal angles.

In step S402, the first calculation unit 302 calculates a normal angle distribution $N_{in}$ based on the shape data acquired in step S401. Specifically, the first calculation unit 302 converts the vertex coordinate data included in the polygon data into height data. FIG. 9A illustrates an example of conversion of vertex coordinate data into height data. In order to simplify the description, a height distribution will be described as a one-dimensional distribution. A marker (point) in FIG. 9A illustrates an example of coordinates of vertex data of a discrete polygon acquired in step S401. Herein, a vertical axis 0 represents a surface of the recording medium. Acquired shape data, i.e., vertex data, is linearly interpolated at a predetermined resolution, and converted into height data $H_{in}$ for expressing a height at a regular interval. In the present exemplary embodiment, the vertex data is interpolated by 4800 dpi. A solid line in FIG. 9A represents height data $H_{in}$ acquired through the interpolation. An interpolation method is not limited to the linear interpolation, and a known interpolation method such as a nearest neighbor method, a bicubic method, or a spline method may be used. The height data $H_{in}$ acquired through the interpolation is converted to a normal angle distribution $N_{in}$ through the following formulas 1 and 2.

$$V = a\tan 2(\mathrm{diff}(H_{in}), 1/\mathrm{DPI}) \quad \text{Formula 1}$$

$$N_{in} = \mathrm{histogram}(V) \quad \text{Formula 2}$$

Here, "diff" is a difference between adjacent data values (heights), and "a tan 2" is a 4-quadrant arctangent. "1/DPI" is an inverse number of a resolution, which corresponds to a distance between data. The formula is a formula for acquiring a normal of a face that connects the adjacent data from among data arranged at a regular interval of 4800 dpi, and "V" is a group of normal vectors. Through "histogram" of the formula 2, the number of normal vectors are counted at each angle, and a normal angle distribution $N_{in}$ that represents a normal angle and its frequency (number of counts) is calculated. The calculated normal angle distribution $N_{in}$ is illustrated in FIG. 9B. In the present exemplary embodiment, the normal angle distribution $N_{in}$ is calculated at 30 dpi (i.e., corresponding to approximately 0.8 mm square) to make the number of data be 160.

If shape data for expressing the above-described normal angle distribution $N_{in}$ is previously generated and acquired in step S401, the processing in step S402 is not executed, and the processing proceeds to step S403.

In step S403, the second calculation unit 303 calculates a reflection characteristic $G_{in}$ according to an incident angle and an output (reflection) angle of light based on the reflection characteristic data acquired in step S401. Specifically, at first, similar to the interpolation processing of the vertex coordinate data executed in step S402, the reflection characteristic data is linearly interpolated in order to acquire data of 4800 dpi. Further, with respect to the linearly-interpolated reflection characteristic data, an average value $G_{ave}$ of specular reflection intensities is calculated in a unit of dpi. Then, a reflection characteristic $G_{in}$ is calculated from the average value $G_{ave}$ of the specular reflection intensities. The reflection characteristic $G_{in}$ in the present exemplary embodiment is a standard deviation σ illustrated in FIG. 7A, which can be acquired by executing Gaussian approximation of the reflection intensity distribution at each output (reflection) angle. The reflection characteristic $G_{in}$ is calculated through interpolation processing by using a look-up table (LUT) where the average value $G_{ave}$ of specular reflection intensities and the reflection characteristic $G_{in}$ are associated with each other. The LUT is created by measuring a reflection intensity of each reflection angle of a surface of a recording medium having the specular reflection intensity $G_{ave}$ in the specular direction and stored in the HDD 213. FIG. 9C is a graph illustrating an example of a surface reflection characteristic expressed by the calculated reflection characteristic $G_{in}$. Although the LUT is used for calculating the reflection characteristic $G_{in}$, the reflection characteristic $G_{in}$ may be calculated to make a spread of light having the specular reflection intensity $G_{ave}$ in the specular direction from the surface of the recording medium, i.e., a reflection intensity distribution at each reflection angle, be a Gaussian distribution. The reflection characteristic $G_{in}$ may be a parameter such as a bidirectional reflectance distribution function (BRDF) which represents a distribution of three-dimensional reflection intensities (reflection ratios).

If reflection characteristic data for expressing the above-described reflection characteristic $G_{in}$ is previously generated and acquired in step S401, the processing in step S403 is not executed, and the processing proceeds to step S404.

In step S404, the estimation unit 304 uses the normal angle distribution $N_{in}$ and the reflection characteristic $G_{in}$ to estimate a reflection characteristic $A_{target}$ at each predetermined area of the shaped object configured of the uneven layer having the normal angle distribution $N_{in}$ and the gloss layer having the reflection characteristic $G_{in}$. The following formula 3 is used for the estimation. The reflection characteristic $A_{target}$ estimated in step S404 is a reproduction target of the appearance (reflection characteristic) of the shaped object. The predetermined area in the present exemplary embodiment is an area corresponding to a minimum unit (pixel) of 30 dpi.

$$A_{target} = N_{in} * \mathrm{gauss}(G_{in}) \quad \text{Formula 3}$$

Here, a symbol "*" represents a convulsion integral, and "gauss" represents a Gaussian function that takes "σ" as a standard deviation. An example of the calculated reflection characteristic $A_{target}$ is illustrated in FIG. 9D. In the present exemplary embodiment, although a value that does not fall within a range of −90 to 90-degrees is ignored by the convulsion operation, the value may be added to the values within the range as a multi-reflection component.

In step S405, the conversion unit 305 converts the resolution of the height data $H_{in}$ acquired in step S402 into a printer resolution of the image forming apparatus 211 to generate printing height data $H_{print}$. In the present exemplary embodiment, the printer resolution of the image forming apparatus 211 is 300 dpi. In other words, in the above-described resolution conversion, the height data $H_{in}$ of 4800 dpi is converted to printing height data $H_{print}$ of 300 dpi. The above-described known interpolation method can be used therefor. If a value acquired by the interpolation does not fall within a range reproducible by the image forming apparatus 211, a message for notifying the user about the above situation may be displayed on the display 215. Further, a value without the reproduction range may be clipped or linearly compressed to the reproduction range.

In step S406, the conversion unit 305 uses the printing height data $H_{print}$ generated in step S405 to estimate the uneven shape formed on a recording medium, and calculates the normal angle distribution $N_{out}$ of the estimated uneven shape. Specifically, the conversion unit 305 firstly executes resolution conversion of the printing height data $H_{print}$ through the following formula 4 to generate estimation height data $H_{out}$ for expressing the height of the estimated uneven shape. In the present exemplary embodiment, the printing height data $H_{print}$ of 300 dpi is converted to the estimation height data $H_{out}$ of 4800 dpi.

$$H_{out}=\text{interp}(H_{print},\text{DPI})*F \qquad \text{Formula 4}$$

Here, "interp" represents the interpolation processing at resolution DPI of 4800 dpi (resolution DPI=4800 dpi), and "F" represents the output characteristic (reproduction precision) of the uneven shape of the image forming apparatus 211 formed into a filter. When the uneven shape is formed on the recording medium, because of spreading of undried ink discharged thereto, there is a case where a shape having a height expressed by the height data cannot be sufficiently formed. Here, the output characteristic is a value which represents in what degree of reproducibility the image forming apparatus 211 can reproduce, on the recording medium, the uneven shape having the height expressed by the height data. A result that is acquired from simulation of the uneven shape formed on the recording medium is formed into a filter, and the filter is used as the filter F. In addition, a known filter such as a moving average filter or a Gaussian filter having a lowpass characteristic may be also used. Subsequently, by using the acquired estimation height data $H_{out}$, a normal angle distribution $N_{out}$ of the estimated uneven shape is calculated through the following formulas 5 and 6.

$$V_{out}=a\tan 2(\text{diff}(H_{out}),1/\text{DPI}) \qquad \text{Formula 5}$$

$$N_{out}=\text{histogram}(V_{out}) \qquad \text{Formula 6}$$

Similar to the above-described "V", "$V_{out}$" is a group of normal vectors. Through "histogram" of the formula 6, the number of normal vectors are counted at each angle, and a normal angle distribution $N_{out}$ that represents a normal angle and its frequency (number of counts) is calculated. Examples of the estimation height data Flout and the normal angle distribution $N_{out}$ are respectively illustrated in FIGS. 9E and 9F.

In step S407, the generation unit 306 uses the reflection characteristic $A_{target}$ and the normal angle distribution $N_{out}$ to calculate a reflection characteristic $G_{out}$ that should be reproduced by the gloss layer to cause the shaped object to have a reflection characteristic of a reproduction target. Similar to the processing in step S404, a reflection characteristic $A_{out}$ of the shaped object formed by stacking the uneven shape (uneven layer) having the normal angle distribution $N_{out}$ and the gloss layer having the reflection characteristic $G_{out}$ is estimated through the following formula 7.

$$A_{out}=N_{out}*\text{gauss}(G_{out}) \qquad \text{Formula 7}$$

An error E between the reflection characteristic $A_{target}$ calculated in step S404 and the reflection characteristic $A_{out}$ of the shaped object having the uneven shape (uneven layer) estimated according to the output characteristic of the image forming apparatus 211 is described by the following formula 8.

$$E=\Sigma(A_{target}-N_{out}*\text{gauss}(\sigma))^2 \qquad \text{Formula 8}$$

Through the processing in step S407, a standard deviation σ that makes the error E in the formula 8 be a minimum value is calculated as the reflection characteristic $G_{out}$. The standard deviation σ that makes the error E be a minimum value is found by repeatedly incrementing the reflection characteristic $G_{in}$ calculated in step S403 in a predetermined unit and evaluating the error E. Correction reflection characteristic data in which the calculated reflection characteristic $G_{out}$ is recorded for each pixel is generated, and the correction reflection characteristic data is converted into a printer resolution through resolution conversion. If a value of the reflection characteristic $G_{out}$ falls outside the reproduction range of the image forming apparatus 211, the situation may be notified to the user via the display 215, or the value thereof may be linearly compressed to fall within the reproduction range. The correction reflection characteristic data may be generated by correcting the data for expressing the reflection characteristic $G_{in}$, or may be generated as new data.

An example of the surface reflection characteristic expressed by the calculated reflection characteristic $G_{out}$ is illustrated in FIG. 9G. A solid line in FIG. 9H represents the reflection characteristic $A_{out}$ calculated by using, through the formula 7, the reflection characteristic $G_{out}$ that makes the error E be a minimum value. A solid line in FIG. 9I represents the reflection characteristic $A_{out}$ calculated by substituting a value of "$G_{in}$" for the value of "$G_{out}$" in the formula 7. Each of dashed lines in FIGS. 9H and 9I represents the reflection characteristic $A_{target}$ of the reproduction target illustrated in FIG. 9D. When the graphs in FIGS. 9H and 9I are compared with each other, it is found that appearance (reflection characteristic) close to the appearance of the case where the uneven shape is highly precisely reproduced on the recording media can be reproduced by correcting the reflection characteristic of the gloss layer according to the output characteristic of the image forming apparatus 211.

Lastly, in step S408, the output unit 307 generates dot arrangement data for expressing dot arrangement of a recording material recorded on the recording medium, and outputs the generated parameter to the image forming apparatus 211. Specifically, the output unit 307 acquires the color data acquired in step S401, executes linear interpolation to make the color data be data of 4800 dpi, and converts the color data to a printer resolution. The resolution conversion is executed through the above-described known method. Based on the color data converted to the printer resolution, the output unit 307 generates first recording amount data for expressing a recording amount of the color ink for forming an image layer on the recording medium through known color separation processing. Based on the first recording amount data, the output unit 307 further generates first dot arrangement data for expressing dot arrangement of the color ink discharged on the recording medium through known halftone processing. Then, the output unit 307 acquires the printing height data $H_{print}$ generated in step S405 and generates second recording amount data for expressing a recording amount of a clear ink for forming the uneven layer on the recording medium based on the printing height data $H_{print}$. Based on the second recording amount data, the output unit 307 further generates second dot arrangement data for expressing dot arrangement of the clear ink discharged on the recording medium. Furthermore, the output unit 307 acquires the correction reflection characteristic data generated in step S407, and generates, based on the correction reflection characteristic data, third recording amount data for expressing a recording amount of a white ink for forming the gloss layer on the recording medium. Based on the third recording amount data, the output unit 307 further generates third dot arrangement data for expressing dot arrangement of the white ink discharged on the recording medium. The output unit 307 outputs the first dot arrangement data, the second dot arrangement data, and the third dot arrangement data generated through the above processing to the image forming apparatus 211, and ends the processing. The image forming apparatus 211 forms the uneven layer, the gloss layer, and the image layer on the recording medium based on the received dot arrangement data. The data to be output to the image forming apparatus 211 from the output unit 307 may be the above-described recording amount data if the image forming apparatus 211 can form the uneven layer, the gloss layer, and the image layer on the recording medium based on the recording amount data. Further, the output unit 307 may output data that expresses dot arrangement of ink at each recording scanning operation executed on the recording medium, which is generated from the above-described dot arrangement data through known pass decomposition processing.

In the present exemplary embodiment, the reflection characteristic data for expressing the reflection characteristic of the gloss layer and the shape data for expressing the shape of the uneven layer are acquired. Then, a reflection characteristic at each predetermine area of the shaped object configured of at least a gloss layer and an uneven layer is estimated based on the acquired reflection characteristic data and shape data. In order to form a shaped object having the estimated reflection characteristic on the recording medium, recording amount data for expressing a recording amount of the recording material and dot arrangement data for expressing dot arrangement of the recording material on a recording medium culture are generated. Through the above-described processing, the reflection characteristic of the shaped object formed on the recording medium can be reproduced with high precision.

A second exemplary embodiment will be described. In the first exemplary embodiment, processing of correcting reflection characteristic data to make a reflection characteristic of a shaped object having an uneven shape (uneven layer) estimated according to an output characteristic of the image forming apparatus 211 be close to a reflection characteristic of a shaped object as a reproduction target has been described. On the other hand, as described above, because the image forming apparatus 211 controls the reflection characteristic according to an area ratio of a white area and a metallic area on a recording medium, there is a case where the reflection characteristic expressed by the reflection characteristic data cannot be sufficiently reproduced. For example, in a case where the white ink is not recorded on a certain area at all, the specular reflection intensity cannot be increased any more. The same can be also said for the opposite case, so that the diffuse reflection intensity cannot be increased any more if the white ink is thoroughly recorded in a certain area. The processing of supplementing by correcting the shape data the reflection characteristic that cannot be sufficiently reproduced by the output characteristic of the image forming apparatus 211 will be described. Hereinafter, a difference will be mainly described while description of portions similar to those in the first exemplary embodiment will be omitted or simplified.

FIG. 8B is a flowchart illustrating a flow of processing to be performed until the image processing apparatus 1 outputs data for forming a three-dimensional shaped object on a recording medium to the image forming apparatus 211. The processing in steps S401 to S404 is similar to the processing described in the first exemplary embodiment, and thus the description thereof will be omitted.

After the processing in step S404, in step S405', the conversion unit 305 converts the reflection characteristic $G_{in}$ calculated in step S403 to the reflection characteristic $G_{out}$ falling within a range reproducible by the image forming apparatus 211. Specifically, as a value representing the output characteristic of the image forming apparatus 211, a reflection characteristic having the greatest specular reflection component, which falls within a range reproducible on the recording medium, is specified as "$G_{min}$". Further, a reflection characteristic having the greatest diffuse reflection component, which falls within a range reproducible on the recording medium, is specified as "$G_{max}$", and the reflection characteristic $G_{out}$ is calculated through the following formulas 9 and 10. Similar to the reflection characteristic $G_{in}$, each of the reflection characteristics $G_{min}$ and $G_{max}$ in the present exemplary embodiment is the standard deviation σ that can be acquired by executing Gaussian approximation of the reflection intensity distribution at each output (reflection) angle.

$$\text{if}(G_{in} > G_{max}), G_{out} = G_{max} \qquad \text{Formula 9}$$

$$\text{if}(G_{in} < G_{min}), G_{out} = G_{min} \qquad \text{Formula 10}$$

In step S406', the generation unit 306 uses the reflection characteristic $A_{target}$ and the reflection characteristic $G_{out}$ to calculate a shape that should be reproduced in the uneven layer to cause the shaped object to have a reflection characteristic of a reproduction target. Specifically, similar to the processing in step S405 described in the first exemplary embodiment, the generation unit 306 firstly generates the printing height data $H_{print}$ through the following formula 11. Here, "$DPI_{print}$" represents a printer resolution.

$$H_{print} = \text{interp}(H_{in}, DPI_{print}) \qquad \text{Formula 11}$$

Then, similar to the processing in step S406 in the first exemplary embodiment, the printing height data $H_{print}$ is converted to the estimation height data $H_{out}$ through the formula 12. Here, a coefficient k is a coefficient for correcting the height expressed by the printing height data $H_{print}$.

$$H_{out} = \text{interp}(H_{print} \cdot k, DPI) * F \qquad \text{Formula 12}$$

Then, the normal angle distribution $N_{out}$ is calculated through the formulas 13 and 14.

$$V_{out} = a \tan 2(\text{diff}(H_{out}), 1/DPI) \qquad \text{Formula 13}$$

$$N_{out} = \text{histogram}(V_{out}) \qquad \text{Formula 14}$$

Similar to the processing in step S407 in the first exemplary embodiment, a coefficient k that makes an error $E_2$ be a minimum value is calculated through the formula 15.

$$E_2 = \Sigma(A_{target} - N_{out} * \text{gauss}(G_{out}))^2 \qquad \text{Formula 15}$$

The coefficient k that makes the error $E_2$ be a minimum value is found by repeatedly incrementing or decrementing the coefficient k in the formula 12 in a predetermined unit and evaluating the error $E_2$. Lastly, a height expressed by the printing height data $H_{print}$ is multiplied by the calculated coefficient k, so that the printing height data $H_{print}$ is corrected. Printing height data $H_{print}$ to output to the image forming apparatus 211 may be newly generated based on a value acquired by multiplying the height expressed by the printing height data $H_{print}$ by the calculated coefficient k.

If the coefficient k calculated in step S406' is greater than 1, the normal angle distribution $N_{out}$ calculated through the formula 14 becomes wider, and the shaped object has a reflection characteristic of higher diffuseness. On the other hand, if the coefficient k is less than 1, the normal angle distribution $N_{out}$ becomes narrower, and the shaped object has a reflection characteristic of higher specularity. In other words, the reflection characteristic of the shaped object formed on the recording medium can be adjusted by adjusting the uneven shape based on the coefficient k.

Lastly, in step S408, the output unit 307 uses the color data acquired in step S401, the printing height data $H_{print}$ corrected in step S406', and the reflection characteristic $G_{out}$ calculated in step S405' to generate dot arrangement data. Then, the output unit 307 outputs the generated dot arrangement data to the image forming apparatus 211.

In the present exemplary embodiment, the reflection characteristic that cannot be sufficiently reproduced by the gloss layer formed in accordance with a reproducing range of glossiness (i.e., output characteristic) of the image forming apparatus 211 is supplemented by correcting the uneven shape of the uneven layer. Through the above-described processing, the reflection characteristic of the shaped object formed on a recording medium can be reproduced with high precision.

Variation Example

In the second exemplary embodiment, correction is made with respect to the height (amplitude) of the uneven layer expressed by the shape data when the reflection characteristic expressed by the reflection characteristic data falls outside the reproduction range of the image forming apparatus 211. However, the exemplary embodiment is not limited to the above-described processing. In order to increase a correctable range of the shape data, there is provided a method of superimposing on the uneven layer an uneven shape different from the shape expressed by the acquired shape data. For example, the formula 16 may be used instead of the formula 12.

$$H_{out} = \text{interp}(H_{print} + (H_{ad} \cdot k), \text{DPI}) * F \qquad \text{Formula 16}$$

Here, "$H_{ad}$" represents a predetermined shape (uneven pattern) previously retained by the image processing apparatus 1, and a sinusoidal pattern of a specific frequency can be used. It is desirable that "$H_{ad}$" be a reproducible uneven shape when the output characteristic of the image forming apparatus 211 is taken into consideration.

Further, in the second exemplary embodiment, although the height expressed by the printing height data $H_{print}$ is corrected by using the coefficient k, the exemplary embodiment is not limited thereto. For example, a frequency (cycle) is calculated through frequency decomposition such as Fourier transformation with respect to the height data. The reflection characteristic that cannot be sufficiently reproduced by the gloss layer may be supplemented by increasing or decreasing the frequency (cycle).

Further, the reflection characteristic of the shaped object is reproduced by correcting the reflection characteristic of the gloss layer in the first exemplary embodiment, whereas the reflection characteristic of the shaped object is reproduced by correcting the shape of the uneven layer in the second exemplary embodiment. However, the processing of the above-described exemplary embodiments may be combined with each other. For example, in a case where the specular reflection intensity of the reflection characteristic of the shaped object formed on the recording medium is greater than that of the target reflection characteristic of the shaped object, a height of the uneven shape is increased by the coefficient k, and an area ratio of the white ink is increased. As described above, it is possible to approximate the reflection characteristic to the target reflection characteristic of the shaped object by making correction on both of the uneven layer and the gloss layer by concurrently executing the correction processing for increasing the diffuse reflection intensity. Further, as described above, as there are more than one combinations of correction methods, a UI screen including candidates of a combination of correction methods may be displayed on the display 215, and the combination thereof may be selected by the user.

In the above-described exemplary embodiments, although a reflection characteristic of the shaped object is reproduced by correcting a reflection characteristic of the gloss layer or a shape of the uneven layer, the exemplary embodiments are not limited to the above-described processing. For example, after the reflection characteristic $A_{target}$ as a reproduction target of the reflection characteristic of the shaped object is calculated in step S404, dot arrangement data or a recording amount data of ink may be directly generated and output based on the reflection characteristic $A_{target}$. Specifically, the dot arrangement data or the recording amount data is generated by using a table in which the reflection characteristic $A_{target}$ is associated with the dot arrangement data or the recording amount data. Shaped objects of various types are formed on recording media while changing the dot arrangement or the recording amount of ink, and the table is created by measuring the reflection characteristics of the formed shaped objects. Further, optimization processing may be executed instead of using the table. For example, dot arrangement or a recording amount that makes a difference between the reflection characteristic of the shaped object formed on the recording medium and the reflection characteristic $A_{target}$ be a minimum value may be selected from previously stored candidates. Alternatively, a UI screen including the above-described candidates, i.e., a method using correction processing, a method using a table, and a method using optimization processing, may be displayed on the display 215, so that the user is allowed to select a method of determining a use method of ink.

Further, in the above-described exemplary embodiments, the height data or the reflection characteristic data is corrected to make an error between the target reflection characteristic of the shaped object and the reflection characteristic of the shaped object formed according to the output characteristic of the image forming apparatus be a minimum value. However, the exemplary embodiment is not limited to the above-described processing. For example, in the first exemplary embodiment, the reflection characteristic $G_{out}$ may be calculated by executing the deconvolution operation of the reflection characteristic $A_{target}$ using the normal angle distribution $N_{out}$. In the second exemplary embodiment, the normal angle distribution $N_{out}$ may be calculated by executing the deconvolution operation of the reflection characteristic $A_{target}$ using the reflection characteristic $G_{out}$, and the printing height data $H_{print}$ may be generated.

Further, in the above-described exemplary embodiments, although the gloss layer is controlled by an area ratio of the white ink and the metallic paper, the uneven layer may be formed of a white ink instead of a clear ink, and the gloss layer may be formed of a metallic ink. In this method, a surface reflection characteristic can be controlled by increasing the area ratio of the metallic ink in an area having a high specular reflection intensity. Further, a general white recording medium (white medium) may be used as the recording medium, and the uneven layer may be formed of a clear ink, whereas the gloss layer may be formed of a metallic ink.

Further, in the above-described exemplary embodiments, although the reflection characteristic of the gloss layer is approximated to a simple Gaussian distribution, another model such as a model which takes a diffuse reflection component caused by environmental light into consideration or a model which takes an anisotropic aspect of changing a reflection characteristic according to a light source direction into consideration can be also used.

Furthermore, in the above-described exemplary embodiments, color data for expressing the color of the image layer is acquired. However, first recording amount data or first dot arrangement data with respect to the color ink may be acquired and directly output to the image forming apparatus 211 instead of acquiring the color data.

Furthermore, in the above-described exemplary embodiments, although the image processing apparatus 1 is connected to the image forming apparatus 211 via the serial bus 209, the image forming apparatus 211 may include the image processing apparatus 1.

In the above-described exemplary embodiments, although respective layers are formed by using a UV curable ink, a photo-curable ink other than the UV curable ink may also be used. In addition, a non-curable water-based ink may also be used. Further, although ink is used as a recording material, toner may also be used. Further, the uneven layer may be formed of a wooden material or a metallic material.

In the above-described exemplary embodiment, an exemplary embodiment in which the uneven layer, the gloss layer, and the image layer are stacked on a recording medium has been described. However, only the uneven layer and the gloss layer may be stacked on the recording medium by using two types of ink.

In the above-described exemplary embodiment, although the processing is executed without taking the shape of the surface of the recording material into consideration, the processing may be executed with consideration for the shape of the surface of the recording medium. For example, data for expressing the shape of the surface of the recording medium is previously generated, and the processing may be executed by using the generated data.

According to an aspect of the present disclosure, a reflection characteristic of a shaped object formed on a recording medium can be reproduced with high precision.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-121704, filed Jun. 21, 2017, which is hereby incorporated by reference herein in its entirety.

What is claimed is:

1. An image processing apparatus which generates data for forming an object including at least a first layer and a second layer as layers of recording materials on a recording medium, the image processing apparatus comprising:
   one or more processors; and
   one or more memories storing instructions, when executed by the one or more processors, causing the image processing apparatus to function as:
   an acquisition unit configured to acquire shape data relating to a shape of the first layer and reflection characteristic data representing a reflection characteristic of the second layer;
   an estimation unit configured to estimate a reflection characteristic at each area of the object based on the reflection characteristic data and the shape data; and
   an output unit configured to output at least any one of recording amount data representing a recording amount of the recording material and dot arrangement data corresponding to dot arrangement of the recording material on the recording medium in order to form on the recording medium the object having the reflection characteristic estimated by the estimation unit.

2. The image processing apparatus according to claim 1, wherein the one or more memories storing instructions, when executed by the one or more processors, causes the image processing apparatus to further function as:
   a conversion unit configured to convert the shape data based on an output characteristic of an image forming apparatus for forming the object on the recording medium; and
   a generation unit configured to generate second reflection characteristic data representing a reflection characteristic of the second layer for forming on the recording medium the object having the reflection characteristic estimated by the estimation unit based on the reflection characteristic estimated by the estimation unit and the shape data converted by the conversion unit, wherein the output unit generates at least any one of the recording amount data and the dot arrangement data based on the shape data and the second reflection characteristic data.

3. The image processing apparatus according to claim 2, wherein the reflection characteristic estimated by the estimation unit is a reflectance distribution of a reproduction target in relation to a reflection angle, and wherein the generation unit calculates a plurality of reflectance distributions by executing convolution operation using the shape data converted by the conversion unit with respect to the second reflection characteristic data while changing a parameter of a reflectance distribution represented by the second reflection characteristic data, and determines, as a reflectance distribution of the second reflection characteristic data, a reflectance distribution of a parameter taken when a reflectance distribution that minimizes a difference from the reflectance distribution of the reproduction target is calculated, from among the plurality of reflectance distributions.

4. The image processing apparatus according to claim 2, wherein the generation unit generates the second reflection characteristic data by executing deconvolution operation using the shape data converted by the conversion unit with respect to the reflection characteristic estimated by the estimation unit.

5. The image processing apparatus according to claim 1, wherein the one or more memories storing instructions, when executed by the one or more processors, causes the image processing apparatus to further function as:

a conversion unit configured to convert the reflection characteristic data based on an output characteristic of an image forming apparatus for forming the object on the recording medium; and a generation unit configured to generate second shape data representing a shape of the first layer for forming on the recording medium the shaped object having the reflection characteristic estimated by the estimation unit based on the reflection characteristic estimated by the estimation unit and the reflection characteristic data converted by the conversion unit, wherein the output unit generates at least any one of the recording amount data and the dot arrangement data based on the second shape data and the reflection characteristic data.

6. The image processing apparatus according to claim 5, wherein the reflection characteristic estimated by the estimation unit is a reflectance distribution of a reproduction target in relation to a reflection angle, and wherein the generation unit calculates a plurality of reflectance distributions by executing convolution operation using the reflection characteristic data converted by the conversion unit with respect to the second shape data while changing a parameter of a height distribution represented by the second shape data, and determines, as a height distribution of the second shape data, a height distribution of a parameter taken when a reflectance distribution that minimizes a difference from the reflectance distribution of the reproduction target is calculated, from among the plurality of reflectance distributions.

7. The image processing apparatus according to claim 5, wherein the generation unit generates the second shape data by executing deconvolution operation using the reflection characteristic data converted by the conversion unit with respect to the reflection characteristic estimated by the estimation unit.

8. The image processing apparatus according to claim 1, wherein the one or more memories storing instructions, when executed by the one or more processors, causes the image processing apparatus to further function as:

a conversion unit configured to convert the shape data and the reflection characteristic data based on an output characteristic of an image forming apparatus for forming the object on the recording medium; and the estimation unit configured to estimate a reflection characteristic at each area of the object based on the shaped data and the reflection characteristic data converted by the conversion unit, wherein the output unit generates at least any one of the recording amount data and the dot arrangement data based on the reflection characteristic estimated by the estimation unit.

9. The image processing apparatus according to claim 1, wherein the output unit generates at least any one of the recording amount data and the dot arrangement data by using a table in which the reflection characteristic estimated by the estimation unit is associated with the recording amount data or the dot arrangement data.

10. The image processing apparatus according to claim 1, wherein the acquisition unit acquires the shape data for representing a normal angle of a surface of the first layer.

11. The image processing apparatus according to claim 1, wherein the estimation unit estimates the reflection characteristic at each area of the object by executing convolution operation using the reflection characteristic data and the shape data.

12. The image processing apparatus according to claim 1, wherein the recording materials are recording materials of two types such as a first recording material for forming the first layer on the recording medium and a second recording material for forming the second layer on the first layer, wherein the recording medium is a metallic medium, and wherein the second recording material is a white ink.

13. The image processing apparatus according to claim 12, wherein the first recording material is a clear ink hardened by light or heat, a wooden material, or a metallic material.

14. The image processing apparatus according to claim 12, wherein the recording amount data and the dot arrangement data corresponding to the first recording material generated by the output unit are data for forming the first layer by stacking the first recording material on the recording medium.

15. The image processing apparatus according to claim 12, wherein the recording amount data and the dot arrangement data corresponding to the second recording material generated by the output unit are data for controlling on the recording medium an area ratio between a specular surface and a diffusion surface by using the second recording material, and wherein the area ratio is controlled by recording a white ink on metallic paper as the recording medium.

16. The image processing apparatus according to claim 1, wherein the recording materials are recording materials of two types such as a first recording material for forming the first layer on the recording medium and a second recording material for forming the second layer on top of the first layer, wherein the recording medium is a white medium, and wherein the second recording material is a metallic ink.

17. An image processing method of generating data for forming an object including at least a first layer and a second layer as layers of recording materials on a recording medium, the image processing method comprising:
- acquiring shape data relating to a shape of the first layer and reflection characteristic data representing a reflection characteristic of the second layer;
- estimating a reflection characteristic at each area of the object based on the reflection characteristic data and the shape data; and
- outputting at least any one of recording amount data representing a recording amount of the recording material and dot arrangement data corresponding to dot arrangement of the recording material on the recording medium in order to form on the recording medium the object having the reflection characteristic estimated by the estimating,
- wherein the image processing method is executed by one or more processors based on instructions stored in one or more memories.

18. A non-transitory computer-readable storage medium storing instructions that, when executed by a computer, cause the computer to perform an image processing method of generating data for forming an object including at least a first layer and a second layer as layers of recording materials on a recording medium, the image processing method comprising:
- acquiring shape data relating to a shape of the first layer and reflection characteristic data representing a reflection characteristic of the second layer;
- estimating a reflection characteristic at each area of the object based on the reflection characteristic data and the shape data; and
- outputting at least any one of recording amount data representing a recording amount of the recording material and dot arrangement data corresponding to dot arrangement of the recording material on the recording medium in order to form on the recording medium the object having the reflection characteristic estimated by the estimating,
- wherein the image processing method is executed by one or more processors based on instructions stored in one or more memories.

* * * * *